United States Patent
Tojyo

[11] 4,059,342
[45] Nov. 22, 1977

[54] MICROSCOPE OBJECTIVE WITH CORRECTING MEANS

[75] Inventor: Tsutomu Tojyo, Hachiouji, Japan

[73] Assignee: Olympus Optical Co., Ltd., Japan

[21] Appl. No.: 651,781

[22] Filed: Jan. 23, 1976

[30] Foreign Application Priority Data

Jan. 28, 1975 Japan .................. 50-11636
Jan. 28, 1975 Japan .................. 50-11637

[51] Int. Cl.$^2$ .................................................. G02B 21/02
[52] U.S. Cl. ........................ 350/175 ML; 350/215; 350/216; 350/255
[58] Field of Search ............... 350/175 ML, 255, 215, 350/216

[56] References Cited
U.S. PATENT DOCUMENTS 2,533,371  12/1950  Heine .......................... 350/175 ML

*Primary Examiner*—Conrad L. Clark
*Attorney, Agent, or Firm*—Cushman, Darby & Cushman

[57] ABSTRACT

A microscope objective with correcting means comprising a front lens group arranged on the object side of a pre-determined airspace and rear lens group arranged on the image side of said airspace and arranged to correct aberrations, which will be caused by difference in thickness of the cover glass, by varying said airspace moving the rear lens group in respect to the front lens group so that a favourable image can be obtained for observation.

6 Claims, 4 Drawing Figures

MICROSCOPE OBJECTIVE WITH CORRECTING MEANS

BACKGROUND OF THE INVENTION a. Field of the Invention

The present invention relates to a microscope objective and, more particularly, to a microscope objective having a correcting means.

b. Description of the Prior Art

When manufacturing a microscope objective, adjustment of the objective is generally carried out by using a cover glass of accurate thickness which is prescribed in JIS (DIN 58884 in West Germany and ASTM Designation E211-65T in U.S.A.). For example, for the most widely used over glass which is provided in JIS R 3702, No. 1s, the standard value of thickness is prescribed as 0.17 mm. When, therefore, adjusting a microscope objective which is intended to be used with a cover glass of thickness according to JIS R 3702, No. 1s, in the course of manufacture, a cover glass having the accurate thickness of 0.17 mm is used for adjustment. On the other hand, however, thickness of cover glasses is not always 0.17 mm accurately but there is an error in the thickness to some extent. In JIS standard, the tolerable range of thickness of the above-mentioned cover glass according to JIS R 3702, No. 1s, for example, is prescribed as 0.15 mm to 0.18 mm. When a microscope objective is actually used in practice, the cover glass to be used with it becomes different from the particular cover glass which was used for adjustment in the course of manufacture. Due to the fact that individual cover glasses have considerable errors in their actual thickness as described in the above, the user has to observe an object by using a cover glass for which the thickness is different from that of the particular cover glass used for adjustment in the course of manufacture. When such cover glass having the thickness different from that of the cover glass with which the objective was adjusted is used for observation, aberrations especially spherical aberration will be aggravated and, therefore, the actual performance of the microscope objective will become inferior to its design performance. For observation in general, however, microscope objectives are used by leaving the deteriorated image as it is due to the reasons that deterioration of the image caused by variation of thickness of the cover glass is not so large and does not have serious influence on the result of observation and that the objective cannot be easily adjusted according to variation of thickness of the cover glass to be used in practice.

Recently, however, more precise observation and measuring are required in the field of medical science, especially in scientific researches in medical science, and in industrial fields. Consequently, even the above-mentioned slight deterioration of the image is not considered as a large disadvantage.

SUMMARY OF THE INVENTION

It is, therefore, a primary object of the present invention to provide a microscope objective with correcting means arranged to prevent deterioration of the image, which is to be caused by difference of thickness of the cover glass from the standard thickness, by varying a pre-determined airspace in the lens system.

Another object of the present invention is to provide a microscope objective with correcting means comprising a front lens group cylinder which carries a front lens group arranged on the object side of said airspace to be varied for correction, a rear lens group cylinder which carries a rear lens group arranged on the image side of said airspace to be varied and is arranged to be movable in respect to said front lens group cylinder, and a first and second correcting cylinders, said microscope objective being arranged to rotate the first correcting cylinder in order to move the second correcting cylinder and to vary said airspace by moving said rear lens group cylinder by utilizing the movement of the second correcting cylinder.

As mentioned in the above, the microscope objective according to the present invention is arranged to prevent deterioration of the image, which will be caused when thickness of the cover glass is different from the standard value, say 0.17 mm, by selecting a certain airspace out of airspaces between respective lens components constituting the microscope objective and varying the value of the selected airspace in proportion to the difference between the standard thickness and actual thickness of the cover glass when the actual thickness of the cover glass is different from the standard thickness, for example 0.17 mm, of the cover glass. By the above arrangement, the microscope objective according to the present invention enables to observe the object by a favourable image which is equivalent to the image obtained when the microscope objective was adjusted in the course of manufacture. The airspace to be varied as above may be selected out of a plural number of airspace according to the number of lens components constituting the lens system. When, however, the amount of variation of the airspaces required for correction of aberrations is very large, the amount of lens movement for varying the airspace also becomes large and, consequently, the mechanism for moving the lens will become complicated. Moreover, when the amount of lens movement is large, misalignment of lenses to be caused by movement of the lens will have large unfavourable influence on the quality of the image. Therefore, it is not preferable to make said amount of lens movement large.

Therefore, as the airspace to be varied as above, it is preferable to select the airspace which satisfies the condition $|f_{II}/f_I| \leq 8$, when respective lens components arranged on the object side of said airspace constitute the front lens group, respective lens components on the image side of said airspace constitute the rear lens group, reference symbol $f_I$ represents the focal length of the front lens group, and reference symbol $f_{II}$ represents the focal length of the rear lens group. When an airspace which satisfies the above condition is selected as the airspace to be varied, the amount of lens movement does not become too large and, therefore, the aforementioned problems do not occur at all. On the other hand, when an airspace which does not satisfy the above condition is selected as the airspace to be varied for correction, the required amount of variation of the airspace becomes too large and this is not desirable. Moreover, as the airspace to be varied, it is preferable to select such airspace which enables to correct spherical aberration especially out of aberrations to be caused by the error in thickness of the cover glass and which does not cause aggravation of the other aberrations when said airspace is varied.

DETAILED DESCRIPTION OF THE PREFERRED EMBODIMENTS

Preferred examples of numerical values of the microscope objective according to the present invention are as shown below.

```
Example 1
        f = 1.0 ,        β = −60.0 ,       N.A. = 0.95
 r₁ = −0.7729
        d₁ = 0.5860      n₁ = 1.77250      ν₁ = 49.6
 r₂ = −0.5966
        d₂ = 0.0172
 r₃ = −8.7677
        d₃ = 0.4137      n₂ = 1.43389      ν₂ = 95.2
 r₄ = −1.1717
        d₄ = 0.1551
 r₅ = −49.3888
        d₅ = 0.1724      n₃ = 1.74         ν₃ = 31.7
 r₆ = 1.7615
        d₆ = 1.0686      n₄ = 1.43389      ν₄ = 95.2
 r₇ = −1.3354
        d₇ = 0.1724
 r₈ = 73.2347
        d₈ = 0.5171      n₅ = 1.618        ν₅ = 63.4
 r₉ = −4.4450
        d₉ = 0.0689
 r₁₀ = 6.1689
        d₁₀ = 0.1724     n₆ = 1.64         ν₆ = 60.2
 r₁₁ = 1.2289
        d₁₁ = 0.7584     n₇ = 1.48656      ν₇ = 84.5
 r₁₂ = 8.8456
Example 2
        f = 1.0 ,        β = −40.0 ,       N.A. = 0.85
 r₁ = −0.2981
        d₁ = 0.6627      n₁ = 1.48656      ν₁ = 84.5
 r₂ = −0.5202
        d₂ = 0.0143
 r₃ = −3.4209
        d₃ = 0.0974      n₂ = 1.61340      ν₂ = 43.8
 r₄ = 12.6485
        d₄ = 0.4941      n₃ = 1.43389      ν₃ = 95.2
 r₅ = −0.9157
        d₅ = 0.0938
 r₆ = 8.0760
        d₆ = 0.3563      n₄ = 1.43389      ν₄ = 95.2
 r₇ = −1.8770
        d₇ = 0.0238
 r₈ = 2.8432
        d₈ = 0.1924      n₅ = 1.61340      ν₅ = 43.8
 r₉ = 1.2000
        d₉ = 0.5226      n₆ = 1.43389      ν₆ = 95.2
 r₁₀ = 9.1119
        d₁₀ = 3.0879
 r₁₁ = −21.0727
        d₁₁ = 0.3563     n₇ = 1.43389      ν₇ = 95.2
 r₁₂ = −3.9309
        d₁₂ = 0.0499
 r₁₃ = −82.7506
        d₁₃ = 0.2375     n₈ = 1.62041      ν₈ = 60.3
 r₁₄ = 1.5637
        d₁₄ = 0.7126     n₉ = 1.43389      ν₉ = 95.2
 r₁₅ = −1.8929
        d₁₅ = 0.2375     n₁₀ = 1.48749     ν₁₀ = 70.1
 r₁₆ = −5.7173
```

In the above, reference symbols $r_1, r_2, \ldots$ respectively represent radii of curvature of respective lens surfaces, reference symbols $d_1, d_2, \ldots$ respectively represent thicknesses of respective lenses and airspaces between respective lenses, reference symbols $n_1, n_2, \ldots$ respectively represent refractive indices of respective lenses, and reference symbols $\nu_1, \nu_2, \ldots$ respectively represent Abbe's numbers of respective lenses.

Figure 1:
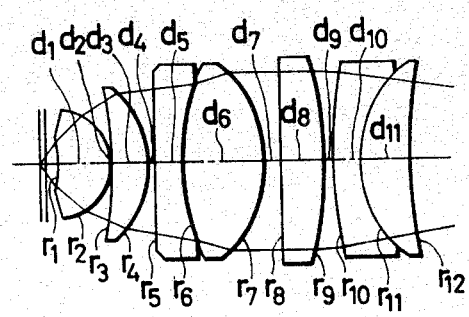
FIG. 1 and FIG. 2 respectively show sectional views of the microscope objective according to the present invention.

Out of the above examples, the lens system according to Example 1 has lens configuration as shown in FIG. 1, i.e., five-component seven-lens configuration and is arranged to correct aberrations, which will be caused by the error in thickness of the cover glass, by varying the airspace $d_4$ between the second and third lens components and to thereby obtain a favourable image. The relation between thickness of the cover glass and airspace $d_4$ for correcting as above is as shown below.

| Thickness of cover glass | $d_4$ |
|---|---|
| 0.14 | 0.2172 |
| 0.15 | 0.1965 |
| 0.16 | 0.1758 |
| 0.17 | 0.1551 |
| 0.18 | 0.1344 |
| 0.19 | 0.1137 |

In the above Example 1, focal lengths $f_I$ and $f_{II}$ of the front and rear lens groups are respectively $f_I = 0.929$ and $f_{II} = 3.61$ when the first and second lens components on the object side of said airspace $d_4$ constitute the front lens group and the third, fourth and fifth lens components on the image side of said airspace $d_4$ constitute the rear lens group. Therefore, their ratio becomes $|f_{II}/f_I| = 3.88$. When, on the other hand, the airspace $d_7$ between the third and fourth lens components is selected as the airspace to be varied, the ratio between the focal length of the front lens group comprising the first through third lens components and the focal length of the rear lens group comprising the fourth and fifth lens components is 12. Therefore, it is not preferable to vary the airspace $d_7$ due to the reason described before. The case is the same when the airspace $d_9$ between the fourth and fifth lens components is selected as the airspace to be varied. When the airspace $d_2$ between the first and second lens components is selected as the airspace to be varied, the ratio of the focal length of the front lens group comprising the first lens component and the focal length of the rear lens group comprising the second through fifth lens components is 1.48. Therefore, the amount of variation of the airspace is not large and unfavourable influence from this view point will not be caused.

In microscope objectives, however, eccentricity between the first and second lens components has extremely large influence on performance of the objective. From this point of view, it is not preferable to select the airspace between the first and second lens components as the airspace to be varied.

Figure 2:
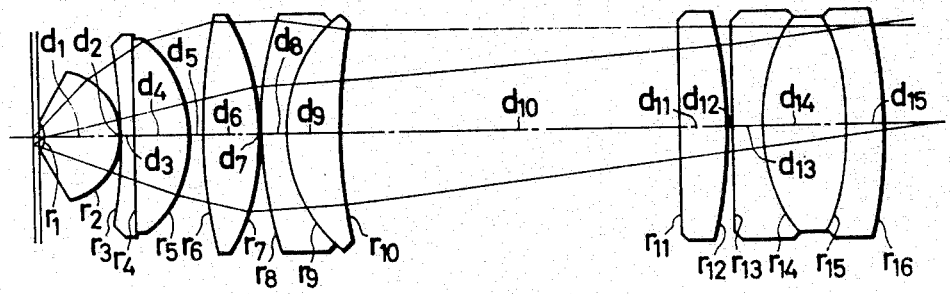

Example 2 has lens configuration as shown in FIG. 2, i.e., six-component ten-lens configuration and is arranged to correct aberrations, which will be caused by the error in thickness of the cover glass, by varying the airspace $d_5$ between the second and third lens components and to thereby obtain a favourable image. The relation between thickness of the cover glass and airspace $d_5$ for correcting as above is as shown below.

| Thickness of cover glass | $d_5$ |
|---|---|
| 0.14 | 0.1727 |
| 0.15 | 0.1463 |
| 0.16 | 0.1203 |
| 0.17 | 0.0938 |
| 0.18 | 0.0675 |
| 0.19 | 0.0413 |

In the above Example 2, the focal length of the front lens group on the object side of the airspace $d_5$ to be varied is $f_I = 1.87$ and the focal length of the rear lens group on the image side of the airspace $d_5$ is $f_{II} = 3.328$ and, therefore, their ratio becomes $|f_{II}/f_I| = 1.78$. In the same way as Example 1, it is not preferable for Example 2 to select any other airspace as the airspace to be varied. When, for example, the airspace $d_{10}$ is selected as the airspace to be varied, the ratio between the focal length of the front lens group comprising the first through fourth lens components and the focal length of the rear lens group comprising the fifth and sixth lens components is 47. Even when any other airspace is selected, said ratio is large except for the case of the airspace $d_2$. Moreover, it is not preferable to select the airspace $d_2$ as the airspace to be varied due to the reason same as the case of Example 1.

As described so far, satisfactorily favourable observation has been impossible when actual thickness of the cover glass to be used for observation is different from its standard thickness. By means of the microscope objective according to the present invention, however, it is possible to easily attain quite favourable observation by varying a predetermined airspace between lenses by a pre-determined amount.

Figures 3, 4:
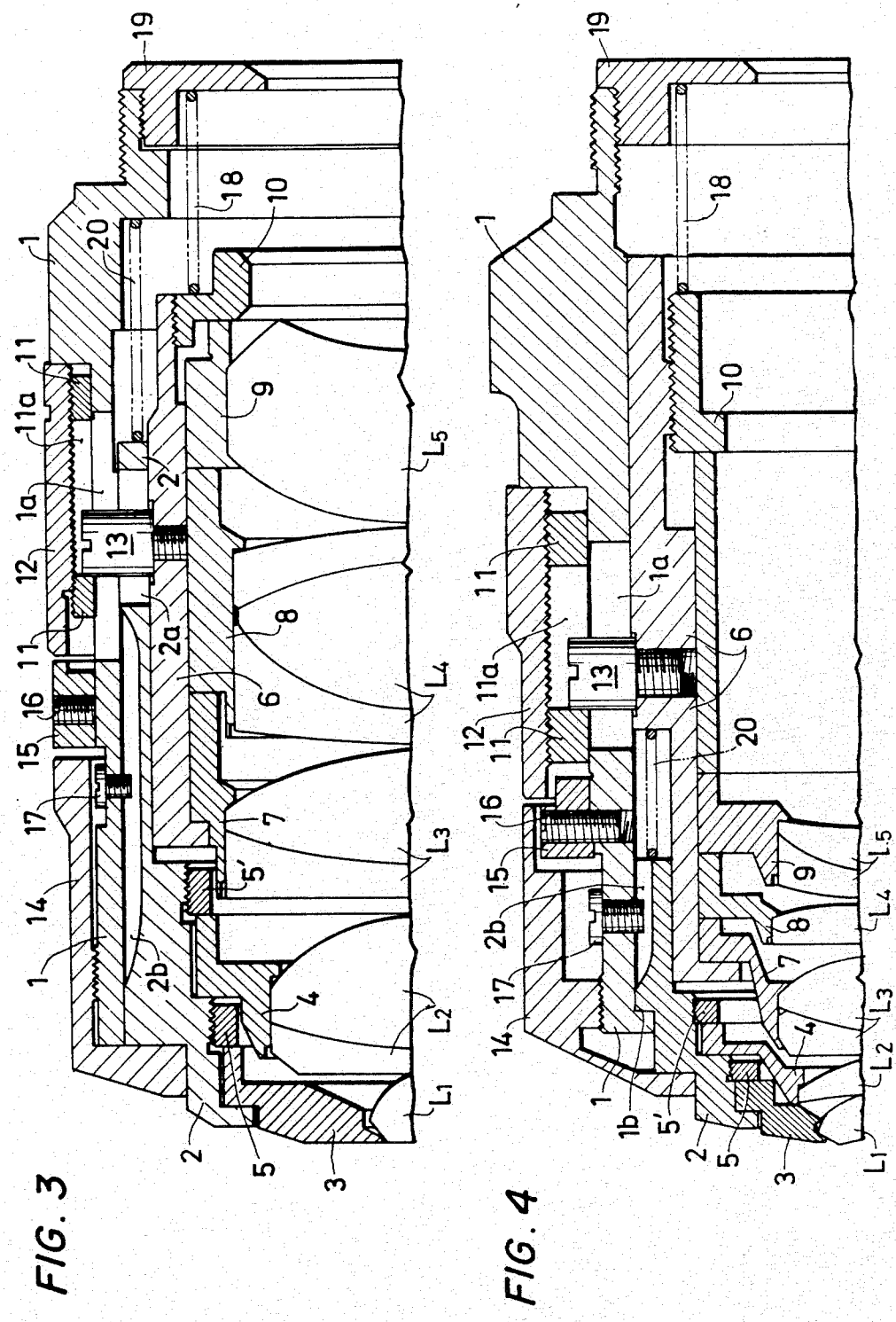
FIG. 3 and FIG. 4 respectively show sectional views of the lens mount of the microscope objective according to the present invention.

Now, embodiment of the correcting means according to the present invention are described below. FIG. 3 shows a first embodiment of the correcting means according to the present invention in which a lens system somewhat different from the above-mentioned two examples is employed. The lens system shown in FIG. 3 comprises lens components $L_1$, $L_2$, $L_3$, $L_4$ and $L_5$ and is arranged to correct aberrations by varying the airspace between the second lens component $L_2$ and third lens component $L_3$. Therefore, the first lens component $L_1$ and second lens component $L_2$ constitute the front lens group while the third lens component $L_3$, fourth lens component $L_4$ and fifth lens component $L_5$ constitute the rear lens group. In FIG. 3, numeral 1 designates an inner cylinder having a slot 1a formed in longitudinal direction (direction in parallel with the optical axis of the objective). Numeral 2 designates a front lens group cylinder fitted into the inner cylinder 1 and having a slot 2a and groove 2b respectively formed in longitudinal direction. To the front lens group cylinder 2, a carrying ring 3 which carries the first lens component $L_1$ and a carrying ring 4 which carries the second lens component $L_2$ are respectively fixed by screwing retaining rings 5 and 5' into the front lens group cylinder 2. Numeral 6 designates a rear lens group cylinder fitted into the front lens group cylinder 2. To the rear lens group cylinder 6, a carrying ring 7 which carries the third lens component $L_3$, carrying ring 8 which carries the fourth lens component $L_4$ and carrying ring 9 which carries the fifth lens component $L_5$ are respectively fixed by screwing a retaining ring 10 into the rear lens group cylinder 6. Numeral 11 designates a first correcting cylinder having a longitudinal slot 11a and fitted onto the outer surface of the inner cylinder 1 so that the slot 11a is positioned just on the outer side of the slot 1a formed in the inner cylinder 1. Numeral 12 designates a second correcting ring screwed onto the first correcting ring 11. Numeral 13 designates a guide pin fixed to the rear lens group cylinder 7 and located in the slot 1a of the inner cylinder 1, slot 2a of the front lens group cylinder 2 and slot 11a of the first correcting ring 11. Numeral 14 designates an outer cylinder mounted to the inner cylinder 1 and numeral 15 designates a stopper ring fixed by a screw 16. Numeral 17 designates a lock pin mounted to the inner cylinder 1. One end portion of the lock pin 17 is inserted into the groove 2b of the front lens group cylinder 2. Numeral 18 designates a bias spring arranged between the retaining ring 10 and retaining ring 19. Numeral 20 designates a buffer spring arranged between the inner cylinder 1 and front lens group cylinder 2.

Function of the above-mentioned correcting means for microscope objective according to the present invention is as described below. The rear lens group cylinder 6 is always kept biased downward, i.e., leftward in FIG. 3, by the force of the spring 18. Therefore, the guide pin 13 fixed to the rear lens group cylinder 6 is also biased in the same direction and is always kept in contact with one end (left end in FIG. 3) of the slot 11a formed in the first correcting ring 11 as shown in FIG. 3. Consequently, the rear lens group cylinder 6 cannot be moved further downward (leftward in FIG. 3) than the state shown in FIG. 3 and is fixed in the state that a pre-determined space is kept between the front lens group cylinder 2 and rear lens group cylinder 6. When the second correcting ring 12 is rotated either clockwise or counterclockwise in the above-mentioned state, the first correcting ring 11 moves in the direction parallel with the optical axis of the objective. As the first correcting ring 11 moves as above, the guide pin 13 also moves along the slot. Consequently, the rear lens group cylinder 6 also moves in the direction parallel with the optical axis of the objective and the airspace between the front and rear lens groups is varied. By the above, it is possible to correct aberrations caused by variation of thickness of the cover glass and to obtain a favourable image as described before.

Now, FIG. 4 shows a second embodiment of the correcting means according to the present invention. In the second embodiment, functions of most of respective members are substantially same as corresponding members of the first embodiment though their constructions are slightly different because of, for example, the difference of lens configuration of the objective used (the lens system according to the afore-mentioned Example 1 is used). Therefore, explanation on individual members is omitted here. The difference of the second embodiment from the first embodiment shown in FIG. 3 is as follows. In the first embodiment, the front lens group cylinder 2 is fitted into the inner cylinder 1 and the rear lens group cylinder 6 is fitted into the front lens group cylinder 2. On the other hand, in the second embodiment, both of the front lens group cylinder 2 and rear lens group cylinder 6 are fitted into the inner cylinder 1 in tandem-like relationship with each other. Therefore, on the contrary to the fact that the buffer spring 19 is arranged between the inner cylinder 1 and front lens group cylinder 2 in the first embodiment shown in FIG. 3, a step portion 6a is formed on the outer surface of the rear lens group cylinder 6 in the second embodiment and the spring 19 is arranged between the front lens group cylinder 2 and said step portion 6a of the rear lens group cylinder 6.

Besides, in the second embodiment, the inner cylinder 1 has a step portion 1b on the inner surface at its front end (left end in FIG. 4). When assembling, therefore, the front lens group cylinder 2, rear lens group cylinder 6, etc. are inserted into the inner cylinder in turn from the right end in FIG. 4. At that time, the first lens component $L_1$ and second lens component $L_2$ are aligned by utilizing the centering holes formed in the front lens group cylinder 2 which are not shown and, then, the outer cylinder 14 is mounted. On the other hand, in case of the first embodiment, respective members are inserted from the left end in FIG. 4 because the inner cylinder 1 does not have a step portion on the inner surface at its front end and, then, respective members should be positioned properly by mounting the outer cylinder 14. In this case, it is therefore impossible to align the first lens component $L_1$ etc. beforehand. To solve this problem, it is necessary to make adjustment such as aligning beforehand by using a fixture which has the shape completely same as the outer cylinder 14 and has centering holes and, then, to replace the fixture with the outer cylinder 14 so that the objective can be assembled properly.

As described in the above, by the correcting means according to the present invention, it is possible to easily adjust the microscope objective so that the most favourable image can be obtained by varying a pre-determined airspace between lenses. To vary said airspace, the first correcting ring is moved along the optical axis of the objective by rotating the second correcting ring, and respective lenses fixed to the rear lens group cylinder 6 and constituting the rear lens group are thereby moved along the optical axis together with the rear lens group cylinder 6. Therefore, even when the cover glass has a slight error in thickness and it is impossible to obtain a favourable image according to the design performance of the objective, it is possible to easily adjust the objective so that the most favourable image is obtained. Moreover, when the correcting means is constructed as illustrated by the first embodiment, the length of the portion by which the front and rear lens group cylinders are fitted to each other can be made long. Consequently, it is possible to minimize misalignment of lenses which may be caused by eccentricity or the like between lenses when the rear lens group cylinder is moved and, therefore, deterioration of performance of the lens system due to such cause does not occur at all. When the correcting means is constructed as illustrated by the second embodiment, it is not necessary to use a special fixture when making adjustment such as aligning and, therefore, it is possible to assemble and adjust the objective easily.

I claim:

1. A microscope objective with correcting means comprising a front lens group arranged on the object side of a pre-determined airspace and a rear lens group arranged on the image side of said airspace, said microscope objective with correcting means being arranged to vary said pre-determined airspace by moving said rear lens group in respect to said front lens group in order to correct aberrations to be caused when thickness of a cover glass used for observation by said microscope objective is different from the corresponding standard thickness of the cover glass and satisfying the following condition when reference symbol $f_I$ represents the focal length of said front lens group and reference symbol $f_{II}$ represents the focal length of said rear lens group:

$$|f_{II}/f_I| \leq 8$$

2. A microscope objective with correcting means according to claim 1, in which said front lens group comprises a first and second lens components and said rear lens group comprises a third, fourth and fifth lens components, said first lens component being a positive meniscus lens, said second lens component being a positive meniscus lens, and third lens component being a cemented positive doublet lens, said fourth lens component being a positive lens, said fifth lens component being a cemented positive doublet lens, said microscope objective having numerical values as given below:

| | $f = 1.0$, | $\beta = -60.0$, | N.A. $= 0.95$ |
|---|---|---|---|
| $r_1 = -0.7729$ | | | |
| | $d_1 = 0.5860$ | $n_1 = 1.77250$ | $\nu_1 = 49.6$ |
| $r_2 = -0.5966$ | | | |
| | $d_2 = 0.0172$ | | |
| $r_3 = -8.7677$ | | | |
| | $d_3 = 0.4137$ | $n_2 = 1.43389$ | $\nu_2 = 95.2$ |
| $r_4 = -1.1717$ | | | |
| | $d_4 = 0.1551$ | | |
| $r_5 = -49.3888$ | | | |
| | $d_5 = 0.1724$ | $n_3 = 1.74$ | $\nu_3 = 31.7$ |
| $r_6 = 1.7615$ | | | |
| | $d_6 = 1.0686$ | $n_4 = 1.43389$ | $\nu_4 = 95.2$ |
| $r_7 = -1.3354$ | | | |
| | $d_7 = 0.1724$ | | |
| $r_8 = 73.2347$ | | | |
| | $d_8 = 0.5171$ | $n_5 = 1.618$ | $\nu_5 = 63.4$ |
| $r_9 = -4.4450$ | | | |
| | $d_9 = 0.0689$ | | |
| $r_{10} = 6.1689$ | | | |
| | $d_{10} = 0.1724$ | $n_6 = 1.64$ | $\nu_6 = 60.2$ |
| $r_{11} = 1.2289$ | | | |
| | $d_{11} = 0.7584$ | $n_7 = 1.48656$ | $\nu_7 = 84.5$ |
| $r_{12} = 8.8456$ | | | |

3. A microscope objective with correcting means according to claim 1, in which said front lens group comprises a first and second lens components and said rear lens group comprises a third, fourth, fifth and sixth lens components, said first lens component being a positive meniscus lens, said second lens component being a cemented positive doublet lens, said third lens component being a positive lens, said fourth lens component being a cemented positive doublet lens, said fifth lens component being a positive lens, said sixth lens component being a cemented triplet lens, said microscope objective having numerical values as given below:

| | $f = 1.0$, | $\beta = -40.0$, | N.A. $= 0.85$ |
|---|---|---|---|
| $r_1 = -0.2981$ | | | |
| | $d_1 = 0.6627$ | $n_1 = 1.48656$ | $\nu_1 = 84.5$ |
| $r_2 = -0.5202$ | | | |
| | $d_2 = 0.0143$ | | |
| $r_3 = -3.4209$ | | | |
| | $d_3 = 0.0974$ | $n_2 = 1.61340$ | $\nu_2 = 43.8$ |
| $r_4 = 12.6485$ | | | |
| | $d_4 = 0.4941$ | $n_3 = 1.43389$ | $\nu_3 = 95.2$ |
| $r_5 = -0.9157$ | | | |
| | $d_5 = 0.0938$ | | |
| $r_6 = 8.0760$ | | | |
| | $d_6 = 0.3563$ | $n_4 = 1.43389$ | $\nu_4 = 95.2$ |
| $r_7 = -1.8770$ | | | |
| | $d_7 = 0.0238$ | | |
| $r_8 = 2.8432$ | | | |
| | $d_8 = 0.1924$ | $n_5 = 1.61340$ | $\nu_5 = 43.8$ |
| $r_9 = 1.2000$ | | | |
| | $d_9 = 0.5226$ | $n_6 = 1.43389$ | $\nu_6 = 95.2$ |
| $r_{10} = 9.1119$ | | | |
| | $d_{10} = 3.0879$ | | |
| $r_{11} = -21.0727$ | | | |
| | $d_{11} = 0.3563$ | $n_7 = 1.43389$ | $\nu_7 = 95.2$ |
| $r_{12} = -3.9309$ | | | |
| | $d_{12} = 0.0499$ | | |
| $r_{13} = -82.7506$ | | | |
| | $d_{13} = 0.2375$ | $n_8 = 1.62041$ | $\nu_8 = 60.3$ |
| $r_{14} = 1.5637$ | | | |
| | $d_{14} = 0.7126$ | $n_9 = 1.43389$ | $\nu_9 = 95.2$ |
| $r_{15} = -1.8929$ | | | |
| | $d_{15} = 0.2375$ | $n_{10} = 1.48749$ | $\nu_{10} = 70.1$ |
| $r_{16} = -5.7173$ | | | |

4. A microscope objective with correcting means according to claim 1, in which said microscope objective with correcting means further comprises an inner cylinder having a slot formed in parallel with the optical axis of said microscope objective, a front lens group cylinder carrying respective lenses constituting said front lens group and arranged in said inner cylinder, a rear lens group cylinder carrying respective lenses constituting said rear lens group and arranged in said inner cylinder so that said rear lens group cylinder can be moved in respect to said front lens group cylinder along the optical axis of said microscope objective, a first correcting ring having a slot formed in parallel with the optical axis of said microscope objective and formed at the position where said slot of said first correcting ring is located just on the outer side of said slot of said inner cylinder, a second correcting ring screwed onto said first correcting ring, and a guide pin fixed to said rear lens group cylinder and located in said slot of said inner cylinder and in said slot of said first correcting ring, said pre-determined airspace being varied by moving said rear lens group cylinder along the optical axis of said microscope objective by means of movement of said guide pin to be obtained by movement of said correcting cylinder, said movement of said first correcting ring being obtained by rotating said second correcting cylinder.

5. A microscope objective with correcting means according to claim 4, in which said rear lens group cylinder is fitted in said front lens group cylinder.

6. A microscope objective with correcting means according to claim 4, in which said front lens group cylinder and rear lens group cylinder are arranged in said inner cylinder in tandem relationship with each other.

* * * * *